Dec. 15, 1936.    E. M. IVENS    2,064,754

VALVE

Filed April 30, 1936    3 Sheets-Sheet 1

Inventor
Edmund M. Ivens
By William W. Deane
his Attorney

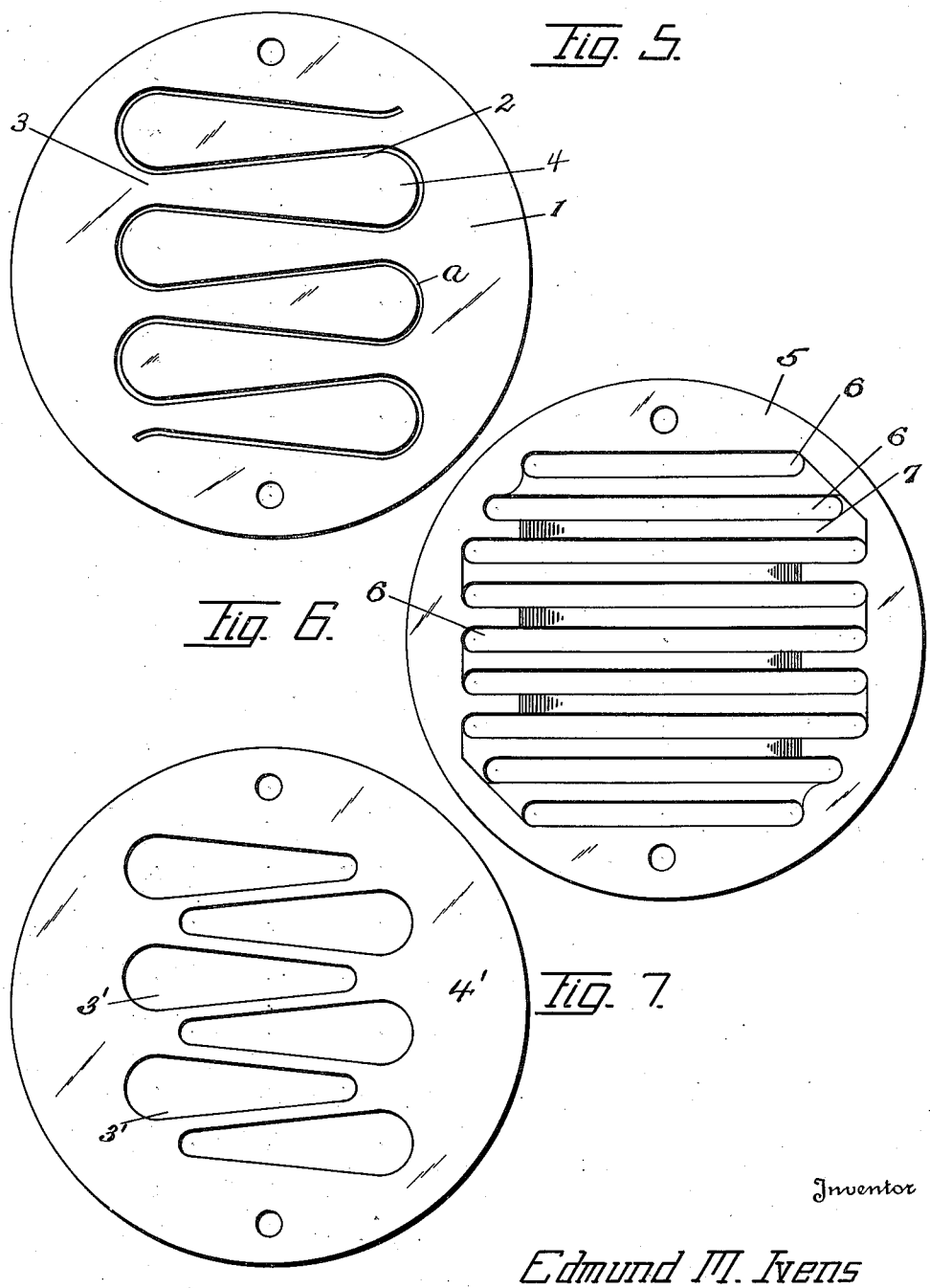

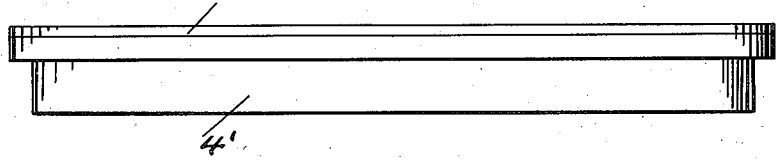
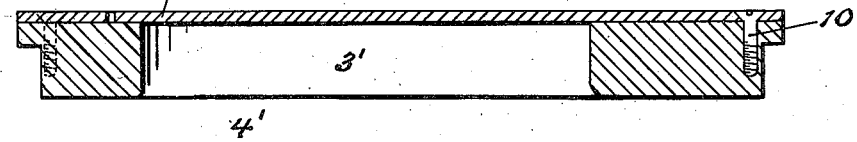
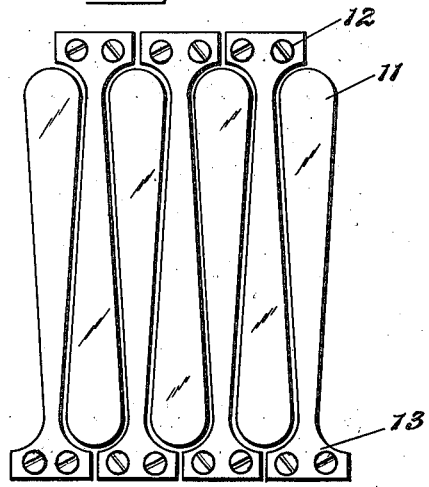
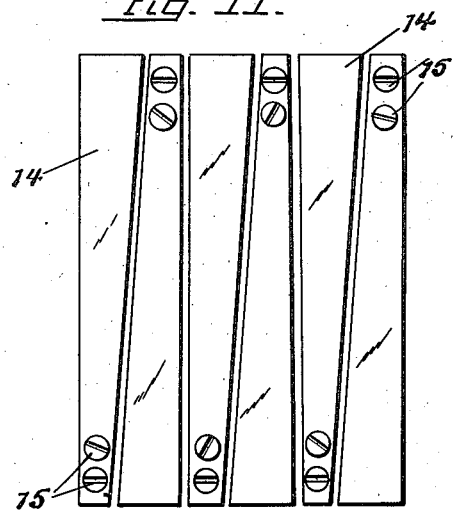

Patented Dec. 15, 1936

2,064,754

UNITED STATES PATENT OFFICE 2,064,754

VALVE

Edmund M. Ivens, New Orleans, La.

Application April 30, 1936, Serial No. 77,238

17 Claims. (Cl. 277—60)

This invention is directed to an improvement in valves designed more particularly for use in compressors, and is especially concerned with the port controlling fingers of such valves.

The primary object of the invention is the provision of port controlling fingers having interlocking function providing relatively large port area with low valve lift, reducing the otherwise necessary large number of valves; insuring minimum valve clearance with noiseless operation; obtaining a shearing cut-off to assure tight closure; and avoiding destructive impact on closing contact which prevents incidental wear, chattering and fluttering.

In providing for the results stated, the fingers are of tapering form, integral with or removably secured to the valve plate at their reduced ends and free beyond such fixed points, the immediately adjacent fingers being reversely positioned with respect to their tapering form and closely spaced to provide the interlocking feature.

The invention is illustrated in the accompanying drawings, in which:

Fig. 5 is a plan of the valve proper or plate, showing the particular fingers of the invention.

Fig. 6 is a bottom plan of the cover of the valve.

Fig. 7 is a plan of the valve seat.

Fig. 8 is an edge view of a valve in accordance with the present invention, wherein the cover is dispensed with.

Fig. 9 is a transverse section of the same.

Fig. 10 is a plan of a series of fingers constructed in accordance with the present invention but designed to be independently secured to the valve seat.

Fig. 11 is a similar view, showing detachable fingers of a slightly different form.

Figure 1:
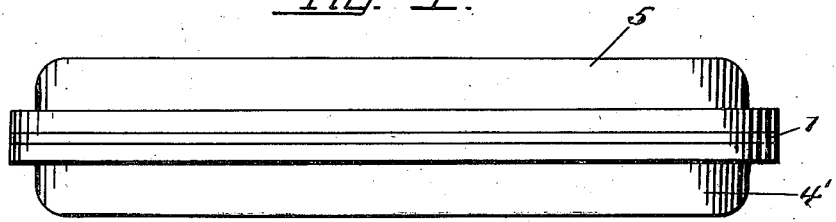
Fig. 1 is a view in elevation of the complete valve.

The valve unit is made up of a valve seat formed with ports, and a valve plate overlying the seat with fingers controlling the ports. A cover to overlie the valve plate and particularly formed to cooperate with and limit the opening movement of the fingers, may be provided when and if necessary or desirable, though such cover is not an entirely essential part for the functions and results desired.

The valve proper or plate 1 is a thin metal plate of circular or rectangular outline, according to the form of the valve to be used. The metal of this plate, as in Fig. 5, is divided along a predetermined line to form within the periphery of the plate a series of fingers 2, which at one end 3 are integral with the plate and at the opposite end 4 are completely free of the plate. The line of division of the metal is of such contour that the fingers are of increasing taper from their connected ends to their free ends, with the immediately-adjacent fingers of reversed taper and position. Thus one finger at its minimum width end which is integral with the plate, is in line with the maximum-width free end of the immediately adjacent finger. The fingers, which are of course free of the plate beyond their integrally-connected ends, are thus capable of providing valve function through substantially their full lengths.

The fingers 2 by reason of their particular form and arrangement are interlocking and each finger performs a valve function by opening and closing (automatically) a port in the valve seat. From the moment of opening, and during the full opening and closing movements, the adjacent edges of neighboring fingers are angularly related and never in the same plane.

The valve seat, shown more particularly in Fig. 7, is an appropriate body corresponding in size and shape with the valve plate, and formed with ports 3', conforming in shape and relatively-reversed arrangement to that of the fingers 2. These ports 3' in the valve seat 4' form the entrant end of the valve, and are closed by direct contact of the fingers 2 at the extreme edges of the ports.

Figure 4:
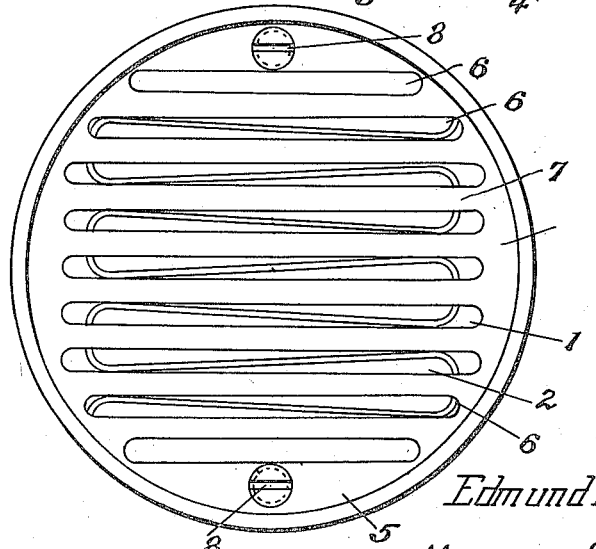
Fig. 4 is a plan of the valve.

The valve cover (Fig. 6) comprises a body of the size and shape of the valve plate, such body, indicated at 5, being formed within its periphery with relatively narrow through-going channels 6, with intervening narrow ribs 7.

Where the valve includes the cover 5, the valve plate 1 is arranged on the valve seat, with the fingers 2 overlying the ports 3', the cover applied with the channels 6 extending in the same direction as the fingers, and bolts 8, passing through the cover, valve plate, and valve seat, arranged to secure all parts as a unit. It will be noted that, shown more particularly in Fig. 4, the ribs 7 overlie the longitudinal center of the fingers 2, and that the width of the ribs is less than that of the fingers at the narrow end. Thus the widened end of each finger cooperates with two adjacent channels, and the opposite ends of adjacent channels cooperate with the widened ends of two adjacent fingers. Thus each finger at its maximum discharge area underlies one and the similar end of two adjacent channels, while the opposite ends of such channels cooperate with two widened ends of alternate fingers. Thus the fingers when opened permit discharge more or less evenly throughout the full length of each channel in the cover.

Figure 2:
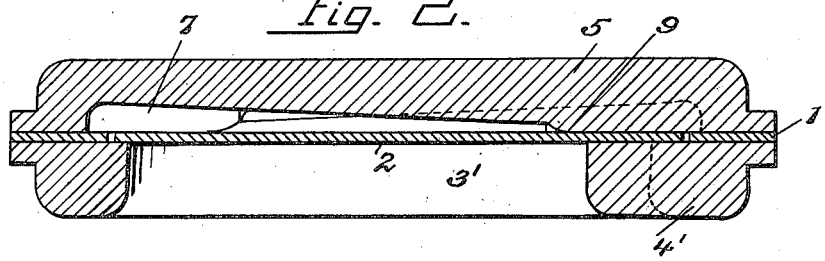
Fig. 2 is a transverse section through the valve.
Figure 3:
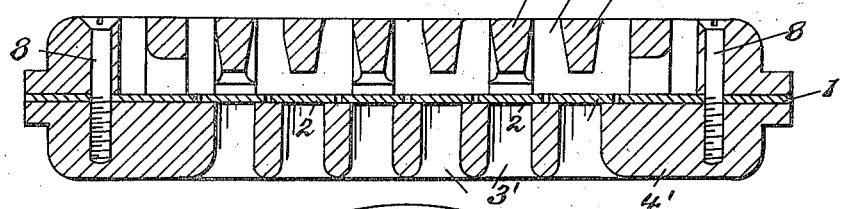
Fig. 3 is a transverse section through the valve, taken at right angles to the line of section of Fig. 2.

The ribs 7 directly overlie the fingers 2, and such ribs on their lower edges, or surfaces directly overlying the fingers are inclined from a point in contact with the integral end of the finger, as at 9, Fig. 2, outwardly from and relative to the fingers, presenting the maximum lift distance of the finger at its free and widened end. This inclined formation of the ribs guides the flexing fingers in easy arcs, limits their lift, and prevents undue strain on the connecting line between the fingers and plate.

The valve may be completely operative, particularly with respect to the fingers, without the cover, under which circumstances, the valve plate 1 will be secured directly to the valve seat 4' by bolts 10, as indicated in Figs. 8 and 9.

While the integral construction of the fingers and plate constitutes the preferable form, it may be found desirable to construct the fingers as independent elements and removably secure them to the valve seat, as illustrated in Figs. 10 and 11. In Fig. 10 the fingers 11 are of the general form of the fingers 2, and disposed in reversed order as previously described. Here, however, the fingers are independent, and at their small or narrowed ends are laterally extended to conform in part to the larger or wider ends of the adjacent fingers. These laterally extended portions 13 of the fingers receive screws 12, whereby each finger is independently secured in place to the valve seat 4'. In Fig. 11, the fingers 14 are shown as strip sections of tapered form and square ends, arranged in relatively reversed order and secured to the valve seat 4' by screws 15 passing through the ends of reduced width.

The invention includes a method of forming a valve plate with integral interlocking valves, in that by an uninterrupted line of cut, indicated at $a$ in Fig. 5, there is formed a series of valve fingers of tapered form, integral with the plate at one end and free of the plate at the opposite end, the adjacent fingers being of relatively reversed form and wholly free of plate material between them.

The valve assembly is of course equally serviceable for suction or discharge, may be located in any position in the compressor cylinder, barrels, or heads; presents maximum port area with low finger lift, noiseless operation, gradual opening and closing obtains closing contact without destructive impact or shock, and provides shearing cut-off to insure tight closure and absence of chattering. Furthermore, there are no wearing parts.

The valve plate is preferably made of thin, tough, flexible steel similar to chrome vanadium steel and of a thickness approaching clock-spring stock. Obviously other appropriate materials and different thickness may be employed where necessary or desirable.

What is claimed as new, is:

1. A valve plate having relatively movable dovetailing valve fingers.

2. A valve plate having dovetailing port-controlling valve fingers of tapered form.

3. A valve plate made up of dovetailing valve fingers of tapered form, the adjacent fingers being in relatively reversed position.

4. A valve element including tapered dovetailing flexible fingers in juxtaposed relatively reversed position, the fingers being secured at one end and free at the opposite end.

5. A valve element including tapered dovetailing flexible fingers in juxtaposed relatively reversed position, each finger being fixed at the smaller end and free at the larger end.

6. A valve plate having integral dovetailing valve fingers, the fingers being tapered and in relatively reversed position successively.

7. A valve plate having integral dovetailing valve flexible fingers, the fingers being tapered and in relatively reversed position successively, the fingers being integral with the plate at their smaller ends and otherwise free of the plate.

8. A valve having tapered, dovetailing flexible fingers fixed at one end, the fingers operating to present maximum porting area at respectively opposite ends of adjacent fingers.

9. A valve unit including a valve seat formed with ports, a valve proper made up of dovetailing tapered fingers cooperating with said ports, and a cover overlying the valve proper and formed with channels and intervening ribs to limit movement of said fingers.

10. A construction as defined in claim 9, wherein the fingers are flexible and secured at one end and free at the opposite end, and wherein the ribs are inclined away from the valve proper in the direction of the free ends of the fingers.

11. A valve unit including a valve seat, a valve proper cooperating therewith and made up of tapering dovetailing flexible fingers fixed relative to the seat at their smaller ends and otherwise free of the seat, and a cover overlying the fingers and formed with ribs forming inclined stops for the fingers when opening.

12. A valve unit including a ported valve seat, and a series of dovetailing flexible tapered fingers secured at one end to the seat to control the seat ports.

13. A valve unit including a ported valve seat, and a series of dovetailing flexible tapered fingers secured at their smaller ends to the seat, the fingers being relatively reversed in successive arrangement.

14. A valve unit including a ported valve seat, and a series of independent dovetailing flexible tapered fingers secured at their smaller ends to the seat, the fingers being relatively reversed in successive arrangement.

15. A valve unit including independent tapered dovetailing flexible fingers, arranged in reversed order and secured at their relatively opposite ends in succession.

16. A valve unit including independent tapered dovetailing flexible fingers arranged in relatively reversed order in use, the smaller ends of the fingers being enlarged for securing purposes.

17. A valve unit including tapered flexible fingers, the smaller ends of alternate fingers fitting between the larger ends of adjacent fingers, the fingers being secured at their smaller ends.

EDMUND M. IVENS.